United States Patent [19]
Dell et al.

[11] 4,321,995
[45] Mar. 30, 1982

[54] CONVEYING AND ACCUMULATING SYSTEM FOR ROLLING ELONGATED ARTICLES

[75] Inventors: Bryce D. Dell, Woodhaven; Glenn B. Waineo, Canton, both of Mich.

[73] Assignee: Ford Motor Company, Dearborn, Mich.

[21] Appl. No.: 103,812

[22] Filed: Dec. 14, 1979

[51] Int. Cl.$^3$ .............................................. B65G 47/26
[52] U.S. Cl. .................................... 198/459; 198/774
[58] Field of Search ............... 198/443, 459, 474, 774, 198/488, 775, 751

[56] References Cited

U.S. PATENT DOCUMENTS

| | | | |
|---|---|---|---|
| 3,130,830 | 4/1964 | Allbeson | 198/774 |
| 3,324,992 | 6/1967 | Morgan | 198/774 |
| 3,623,600 | 11/1971 | Dell | 198/774 |
| 3,729,086 | 4/1973 | Phillips et al. | 198/774 |
| 4,050,571 | 9/1977 | Kushigian | 198/774 |
| 4,102,449 | 7/1978 | Shufran | 198/774 |

*Primary Examiner*—Joseph E. Valenza
*Attorney, Agent, or Firm*—Donald J. Harrington; Frank G. McKenzie

[57] ABSTRACT

A conveyor system for transporting, accumulating and regulating the flow of elongated rolling workpieces from the conveyor which has a stationary set of rails providing article supporting surfaces in the form of downwardly sloping pockets, each having a mechanical stop at its forward end; a movable rail assembly having a similar plurality of article supporting surfaces formed on its upper edge, each having a mechanical stop between each pocket for preventing the forward advance of articles on its surface; a hydraulic cylinder, whose actuation is controlled by an electrical relay system adapted to raise and lower the movable rail assembly; a second hydraulic cylinder adapted to advance the movable rail assembly to a forward position at which the forwardmost conveyed article can be transferred to the stationary rail along which it can travel to the destination work station.

2 Claims, 12 Drawing Figures

CONVEYING AND ACCUMULATING SYSTEM FOR ROLLING ELONGATED ARTICLES

BACKGROUND OF THE INVENTION

1. Field of the Invention

This invention relates to a conveyor system for transporting, storing and regulating the flow rate of articles exiting the conveyor. It is more particularly directed to such a conveyor system for use with elongated articles that furnish surfaces on which the articles may roll, such as camshafts and the like, when they are transferred between support rails that are cyclically raised and lowered.

2. Description of the Prior Art

During the highly automated, high volume production of parts requiring several forming processes during their manufacture, it is essential that the parts progress along a process line that carries the articles from the raw stock condition to the machines that form the parts to their final shape. Generally, several forming stations are required for such an operation, and typically an automatically controlled conveyor will transport the articles between the stations.

The amount of time required at each work station to complete its operation differs among the various stations of the process line. Whereas one machine performing an initial operation on the article will complete its work within a brief period of time, a later operation might require a substantially greater period of time. In such a case, a conveyor that transports articles between two such forming machines, even one that extends for perhaps 100 feet between the work stations, will become filled with articles awaiting admittance to the slower work station. A conveyor having only the ability to advance the articles along its length would require means for removing articles from the conveyor, storing them, and later returning them to the conveyor for transport to the succeeding work stations of the manufacturing process. A conveyor operating in a high volume automatically controlled assembly line will require some capacity for storing articles to adjust for the different process steps of the machining operation. In addition, when articles have completed their travel along the conveyor, they must be held ready for introduction to the next work station at a rate that is compatible with the ability of that station to receive them.

Conveyors suitable for operating in such an environment have been developed for imparting a step-by-step forward motion to workpieces whereby they are advanced a short distance at a time along the conveyor length. Examples of conveyors wherein the transported articles are moved forward incrementally only as preceding workpieces are removed from forward positions on a toggle are described in U.S. Pat. No. 2,948,386 and Polish Pat. No. 51,850. Still another conveyor operating on the incremental forward motion principle but using a reciprocating vertical motion to lift the conveyed articles from a stationary support rail to a movable support rail has been disclosed in U.S. Pat. No. 3,623,600. Each of the conveyors described in these patents requires some means for sensing the presence of an article in a forward position on the conveyor which presence will operate to prevent forward motion of succeeding workpieces. Generally, the advancement of the articles results because of a pivoting mount of the carrier members of the conveyor, which upon pivoting move the workpieces forward onto the next toggle member.

SUMMARY OF THE INVENTION

The conveyor system, according to this invention, provides a stationary set of rails and a moveable rail assembly that support the elongated workpieces on a plurality of inclined pocket surfaces having mechanical stops formed at their forward ends to prevent rolling movement of the workpieces. The conveyed articles each furnish at least two surfaces on which the article may roll on the inclined surface of the pockets of the stationary rails and a movable rail assembly. The movable rail assembly is adapted to be raised and lowered cyclically when it is driven by reciprocating movement of a hydraulic actuator that is controlled by a system of electrical relays. When the rail assembly is elevated, the workpieces are lifted off the supporting surfaces of the stationary rail and onto the movable rail. Upon clearing the stops of the stationary rail, the articles are then free to roll forward on the pocket surfaces of the movable rail because the pockets of the movable rail are offset exactly one workpiece position from that of the stationary rail. When the rail is lowered, the articles are transferred back from the movable rail onto the stationary rail. Upon clearing the stops of the movable rail, the articles are free to roll forward into engagement with the stops on the sloping surfaces of the stationary rail pockets. In this way the articles are advanced along the conveyor length by the cyclical raising and lowering movement of the movable rail assembly.

Articles can be accumulated along the conveyor because at the forward end of the movable rail a recess is formed having the capacity to accommodate on its supporting surface only one workpiece. Consequently, as the movable rail is raised and lowered, the workpiece located in that recess is unable to roll forward on either the movable or stationary rails. However, if the movable rail assembly is advanced forward in the direction of transport while elevated, the most forwardly positioned article can be transferred back onto the stationary rail when the assembly is lowered. Then that workpiece can roll along an inclined surface of the stationary rail into the work station where the next manufacturing operation can be performed. The regulated flow of workpieces from the terminal end of the conveyor into the destination work station is, therefore, regulated by the control exercised by a second hydraulic cylinder that advances the movable rail assembly to the forward position. A system of relays is effective in determining when the work station is ready to accept an additional workpiece and is easily adapted to actuate the hydraulic cylinder that ultimately permits a metered flow of workpieces into the work station.

It is an object of this invention, therefore, to provide a conveyor system for transporting elongated rolling workpieces in a forward direction between work stations on an assembly line.

It is another object of this invention to provide a conveyor that has the capacity to store advancing workpieces on its surface and to accumulate workpieces at its forwardmost end until the destination work station is ready to accept them.

It is a further object of this invention to provide a conveyor system that will continue to accumulate articles on its surface beginning at the forwardmost extremity and continuing rearwardly from that point while advancing articles placed upon its surface at the induction end of the conveyor.

It is still another object of this invention to provide means whereby the flow of conveyed articles from the conveyor into the work station is controlled by the ability of the work station to accept articles from the conveyor.

DESCRIPTION OF THE PREFERRED EMBODIMENT

A conveyor system according to this invention will be described with regard to its ability to transport, accumulate and meter the flow of camshafts along its length; but any elongated article able to roll on its outer surface can operate with the conveyor to produce the desired result.

Figure 1:
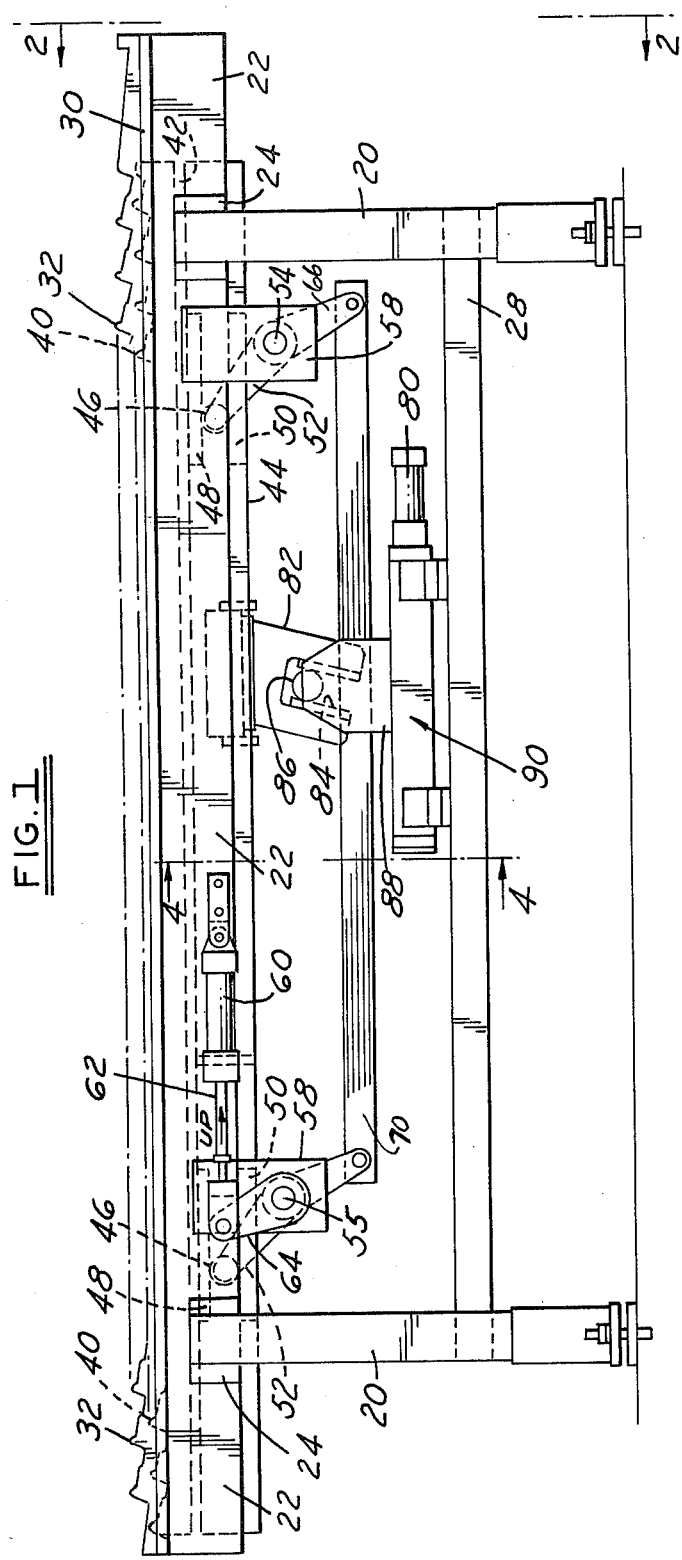
FIG. 1 is a side elevation view of a conveyor system according to this invention.
Figure 2:
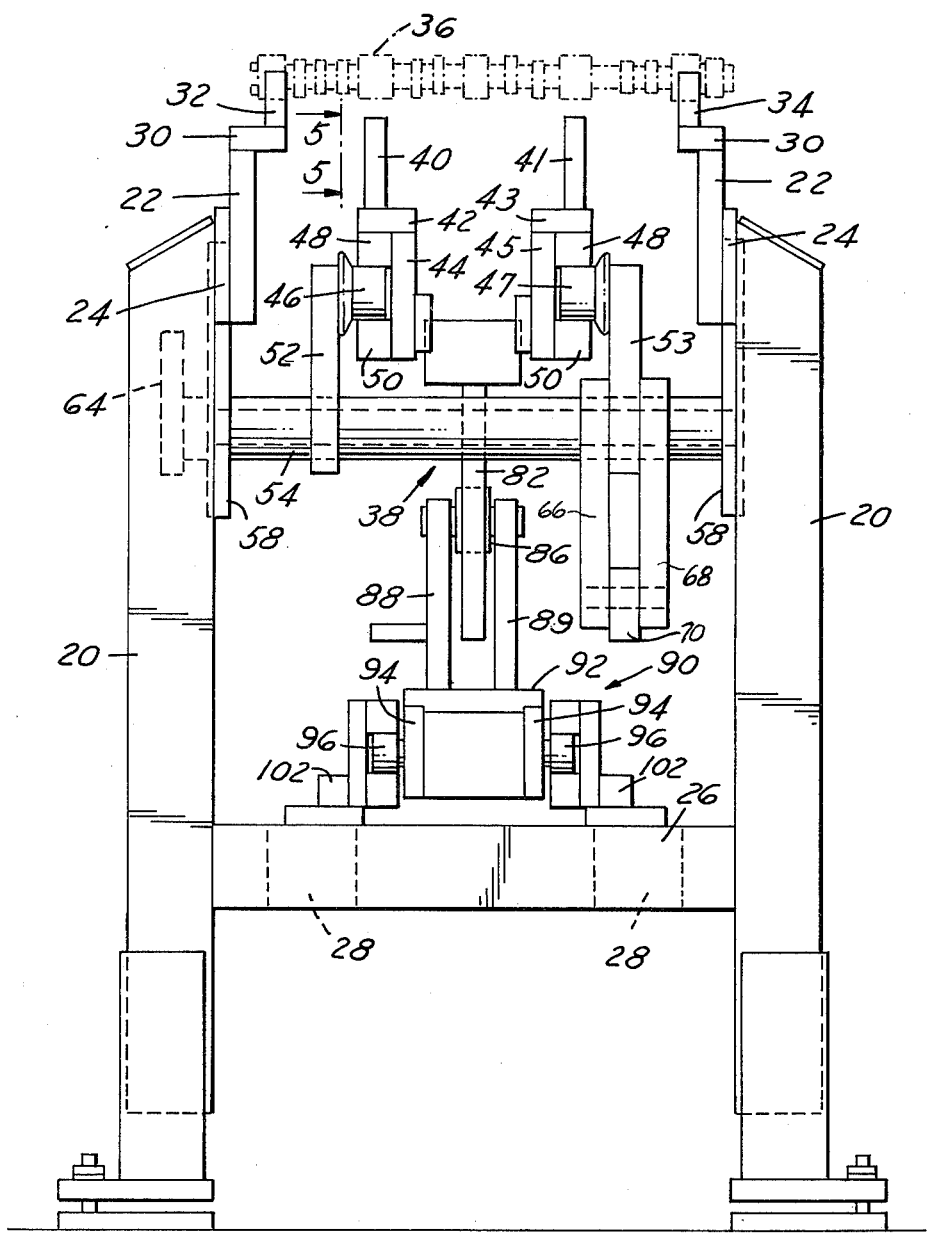
FIG. 2 is an end elevation view of the conveyor system shown in FIGS. 1 and 3.
Figure 3:
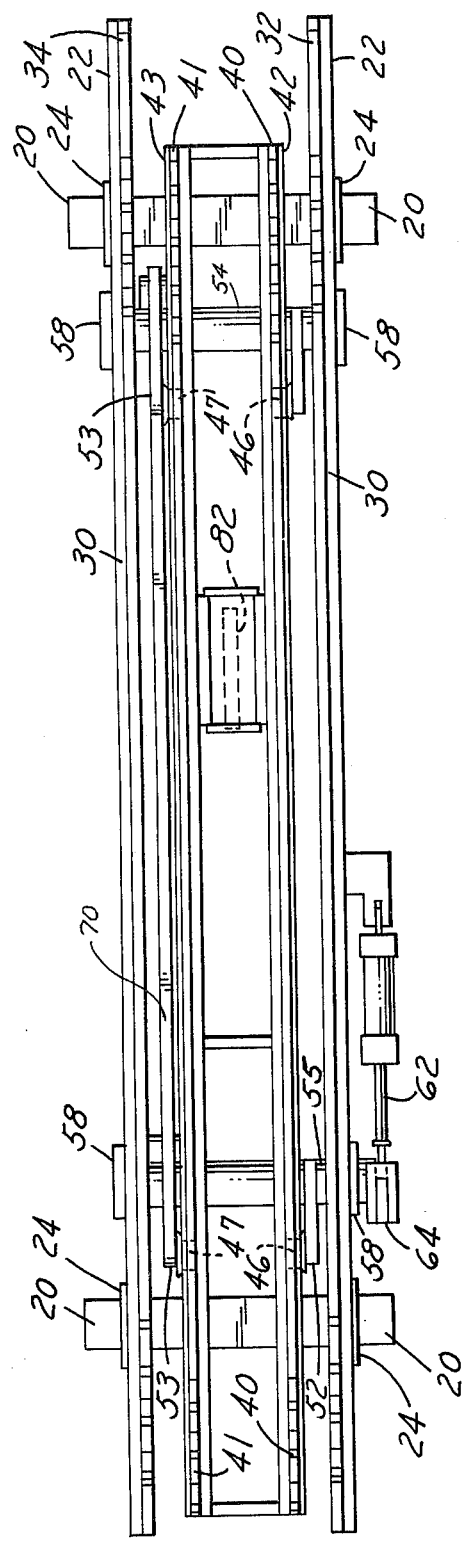
FIG. 3 is a plan view of the conveyor system shown in FIGS. 1 and 2.

Referring first to FIGS. 1, 2, and 3, the conveyor system of the present invention is supported at least at the four corners by columns 20 which are fixedly secured to a floor and extend upwardly therefrom to a longitudinally extending brace 28 provide intermediate lateral support and stability to the columns 20.

The horizontally extending plates 30 join the plates 22 to a pair of stationary rails 32, 34 that extend along the length of the conveyor and provide article-advancing pockets on their upper edges. FIG. 2 shows a camshaft 36, for example, being supported on the stationary rails 32, 34 near the axially opposite ends of the camshaft.

A movable rail assembly 38 located between the stationary rails and extending substantially along the length of the conveyor is adapted to be moved upwardly from the position shown in FIGS. 1-3 to transfer the conveyed article from the stationary rails onto the movable rails. The assembly 38 is also capable of being moved downwardly from its raised position whereby the conveyed article is transferred back from the movable rails onto the supporting surface of the stationary rails.

The movable rail assembly 38 includes two lower plates 44, 45, mounting plates 42, 43 which are welded to the upper edges of the lower plates and have the movable rails 40, 41 welded to their upper surfaces. The rails 40, 41 and the plates 42-45 extend substantially along the entire length of the conveyor and are arranged symmetrically about its longitudinal centerline. Roller guides 48, 50 are fixed to the outer surfaces of the lower plates 44, 45 and provide, within the space between them, track surfaces on which rollers 46, 47 are easily moved. The rollers 46, 47 are rotatably mounted on the inner surfaces of the bellcrank arms 52, 53, which are fixed to the outer surface of the shafts 54, 55 that extend laterally across the width of the conveyor. The shafts 54, 55 are permitted to rotate in the journals 56, 57 of the support plates 58 that are attached locally to the outer surfaces of the plates 22.

A hydraulic cylinder 60 mounted at one of its ends on the stationary plate 22 has a piston rod 62 slidably mounted within the cylinder and is attached at its outer end to the crank arm 64 by the clevis 65. The crank arm 64 is fixed to the shaft 55 and causes the shaft to rotate as the hydraulic cylinder is actuated and the piston reciprocates. The crank arms 52 on the near side of the conveyor as viewed in FIG. 1 are welded to the outer surface of the shafts 54, 55. On the far side, the crank arm 53 is welded to the outer surface of the shafts 54, 55; and the lower bellcrank arms 66, 68, similarly welded to the shafts 54, 55, depend therefrom to a drawbar 70 to which the crank arms 66, 68 are attached. The drawbar 70 extends longitudinally between the rearward shaft 55 and the forward shaft 54 to transmit the rotary movement of the shaft 54 that results when the cylinder 60 is actuated to the shaft 54.

In operation, when the piston 62 is moved in the direction of the arrow UP of FIG. 1, the crank arm 64 is displaced longitudinally causing the shaft 55 to rotate. The shaft 54 rotates also through the action of the drawbar 70 and the lower crank arms 66, 68. As the shafts turn, the upper bellcrank arms 52, 53 rotate clockwise when viewed as in FIG. 1; and the movable rail assembly 38 is raised because the rollers 46, 47, moving on the track surfaces 48, 50, lift the plates 42-45 and the movable rail 40, 41 to which they are attached. The rail assembly 38 is supported in the raised position by the hydraulic pressure applied to the cylinder 60; and when the piston stroke is reversed in direction, the rail assembly is lowered.

In addition to being moved vertically, the movable rail assembly 38 is able to be advanced in the forward direction of transport and to be returned to the rearward position as shown in FIG. 1 because of the guided support given the rollers 46, 47 in the tracks provided by the guide surfaces 48, 50. This axial motion is caused by a second hydraulic cylinder 80 that is mounted on the longitudinal brace 28 and provides the driving force for extending and retracting the movable rail assembly 38. The mechanism for transmitting the transfer stroke from the hydraulic cylinder 80 to the movable rail assembly 38 is best seen in FIGS. 1 and 2 wherein a yoke 82 mounted on the underside of the rail assembly 38 receives within its guide surface 84 a roller 86 that is fixed between upwardly extending flanges 88, 89 that are part of and fixedly attached to the axial displacement transfer dolly 90.

Figure 4:
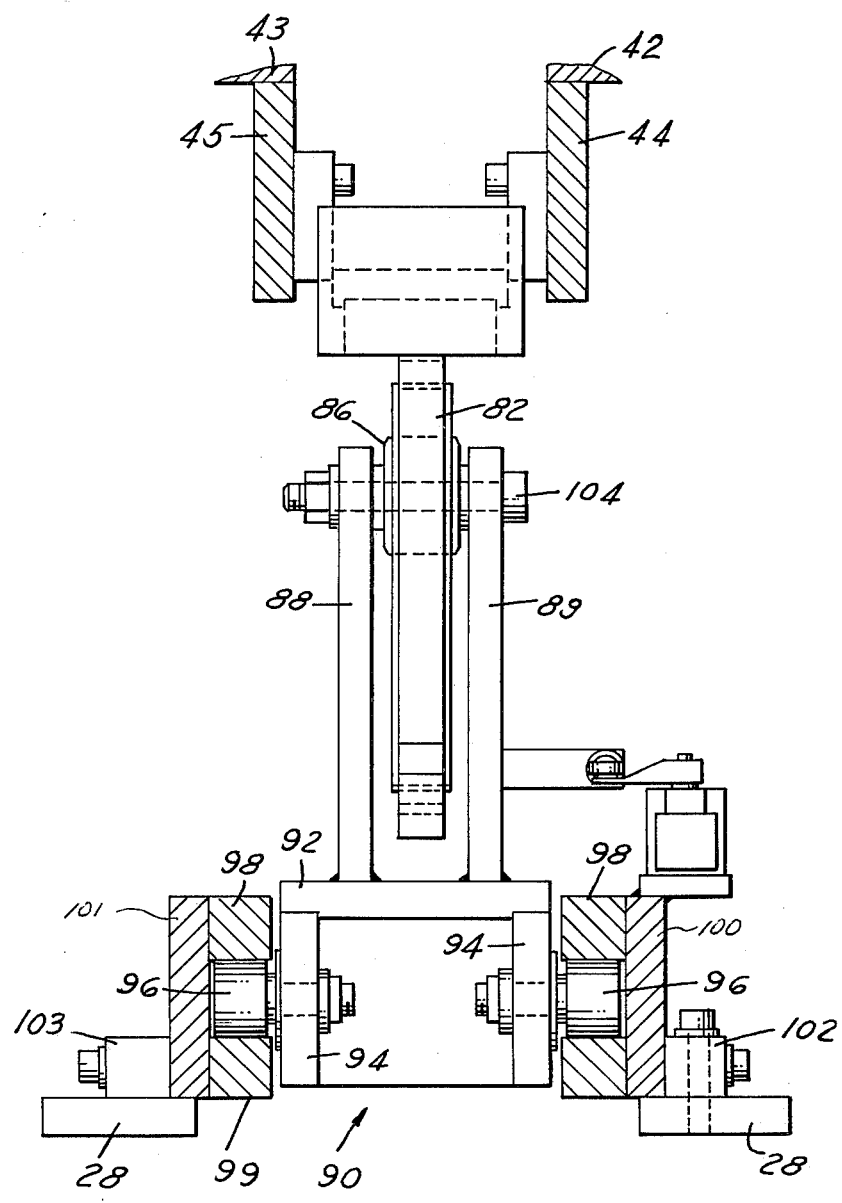
FIG. 4 is an end view taken at plane 4—4 of FIG. 1 showing the axial displacement transfer dolly that operates to extend and retract the movable rail assembly.

The details of construction of the dolly are shown more particularly in FIG. 4. The dolly includes a horizontal plate 92 on which the upwardly extending flanges 88, 89 are mounted. The rollers 96, 97 are mounted on the side members 94 for rotation and are guided between and travel along the surfaces provided by the guide rails 98, 99. The guide rails are mechanically attached to the supporting plates 100, 101 which ultimately connect the supporting structure to the upper surfaces of the longitudinal brace 28 by way of the mounting blocks 102, 103. The support structure, therefore, furnishes a fixed longitudinal path along which the dolly 90 is guided as it moves in response to force supplied by the hydraulic cylinder 80. The bolt 104 passes through the thickness of the flanges 88 and provides a surface on which the roller 86 located between the guide surfaces 84 of the yoke 82 may rotate. The upper end of the yoke 82 is joined by conventional mechanical attachment and by welding to the lower plates 44, 45 of the movable rail assembly 38.

In operation, when the hydraulic cylinder 80 is actuated to produce a forward advance of the movable rail assembly 38, the transfer dolly 90 rolls on the track surfaces furnished by the guide rails 98, 99. The roller 86, moving with the dolly and fitted within the slot of the yoke, transmits the advancing force to the yoke and thereby causes the movable rail assembly 38 to move forward. The extent to which the hydraulic cylinder 80 will advance the dolly 90 is determined by the control exercised by proximity switches which in turn control the hydraulic valves that apply hydraulic fluid pressure to the hydraulic cylinder. The piston within the cylinder is double acting so that when hydraulic fluid pressure is applied to its opposite face the movable rail assembly is caused to be retracted and to return to the position shown in FIG. 1. The guide surfaces 84 of the yoke 82 are sufficiently long so that the raising and lowering motion imparted to the movable rail assembly 38 by the hydraulic cylinder 60 can occur without disengaging the roller 86 from the yoke guide surfaces. The canted direction of the slot within the yoke 82 is effective in assuring that when the movable rail assembly is raised it will have a component of motion in the forward direction of transport as well.

The conveyor system is capable of storing the articles at the extreme forward end of the conveyor if the machine to which the articles are to be delivered is not prepared to accept them. A further operational characteristic is the ability of the conveyor system to meter the flow of conveyed articles from the conveyor at an orderly and predetermined rate of flow. The interaction of the movable rails 40, 41 with the stationary rails 32, 34 in performing the operations of which the conveyor system is capable is illustrated in the series of FIGS. 5-12. These Figures illustrate a side view taken along the center line of the conveyor system and show the movable rail 41 and the stationary rail 34 that are located on the left side of the conveyor shown in FIGS. 1-3. It will be recognized that the operational description that follows, although stated with respect the rails 41, 34, applies as well to operation of the rails 40, 32. Since the elongated articles to be conveyed have the capacity to roll, at least two surfaces of the article are required for correct operation. It is, therefore, necessary that the center of gravity of the article be located between the stationary rails 32, 34 and the movable rails 40, 41 which alternatively support the articles in the operational sequence of this conveyor system. Therefore, in the following description, when the movable rail 41 is moved either vertically or longitudinally, it should be understood that the corresponding movable rail 40 undergoes the same motion at the same time. Similarly, when the stationary rail 32 is described as supporting the articles on its surface, it is understood that the corresponding stationary rail 34 supports the opposite end of the elongated articles being conveyed.

Figure 5:
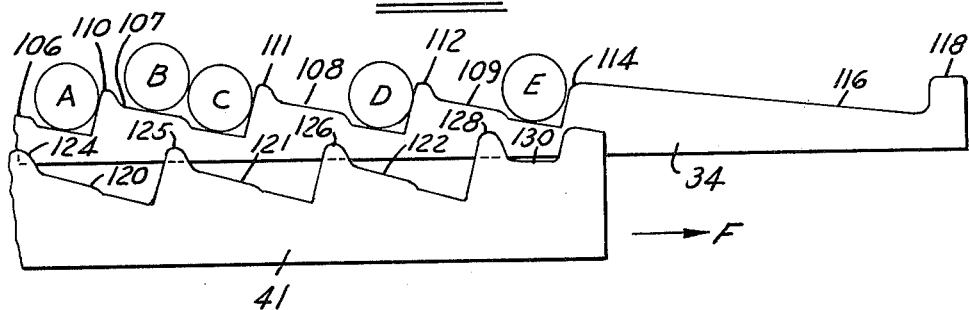
FIG. 5 is a front elevation view of the forward end of the conveyor showing the article supporting pockets, the terminal sloping surface, and the forward holding recess. Articles to be conveyed are shown randomly distributed on the upper surface of the stationary rail.

With reference to FIG. 5, the stationary rail 34 is seen to provide a plurality of article supporting pockets 106-109. Each is defined as the downwardly sloping surface formed on the upper edge of the rail 34 located between the projections 110-112, which are located at the rear extremity of each pocket and extend above the forward end of the immediately succeeding pocket to provide a stop for the articles A-E being transported. It can be seen that each pocket is adapted to support at least two articles, one being in a forward position resting against the stop. Immediately in front of the forwardmost pocket 109 a forward projection 114 furnishes a stop for articles located on pocket 109 and forms the crest of a sloping surface 116 that terminates in a forward stop 118. The movable rail 41 is shown in FIG. 5 in the vertically lowered and longitudinally retracted position it occupies in the FIGS. 1-3.

The contours formed on the upper edge of the movable rail 41 conform generally to the contours of the pockets of the stationary rail 34, but with a few exceptions. The upper edge of the rail 41 has formed thereon a plurality of article supporting pockets 120-122 characterized by a sloping surface inclined toward the forward direction of transport, which is indicated by the arrow F. At the rear extremity of each pocket, the projections 124, 125, 126, 128 extend above the forward end of the pockets immediately behind to provide stops for articles that are located in each pocket. Immediately preceding pocket 122 a forward projection 128 functions as a stop for articles located within pocket 122 and forms the rear surface of a recess 130, which is capable of supporting only one article. At the extreme forward end of the movable rail 41 a forward stop 129 furnishes the forward surface of the recess 130. The projections or stops 124, 125, 126, 128 are positioned in the longitudinal sense approximately one-half of the distance between longitudinal extremities of the pockets of the stationary rail 34. This characteristic is important because the stops 124, 125, 126 and 128 when moved vertically with respect to the stationary rail 34 operate to separate articles that are located within a particular pocket as, for example, articles B and C located within pocket 107.

Figure 6:
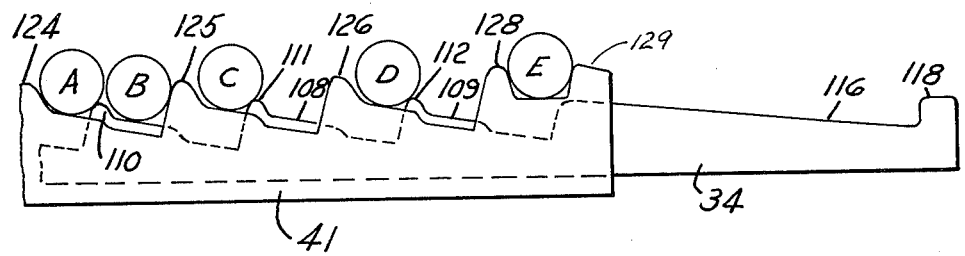
FIGS. 6-8 show the article advancing function of the conveyor system operating through one cycle to advance articles along the conveyor system by the raising and lowering motion of the movable rail assembly and the rolling movement of the articles on the rail support surfaces.

FIG. 6 illustrates the movable rail 41 having been raised and advanced forward slightly by reason of the canted guide surfaces 84 of the yoke 82. The conveyed articles have been transferred from the pocket surfaces of the stationary rails onto the pocket surfaces of the movable rail 41, and the projections 110-112 of the stationary rail prevent articles C and D from rolling forward. The raising, lowering, advancing and retracting motion illustrated in FIGS. 6-10 results from the actuation of the hydraulic cylinders 60, 80.

Figure 7:
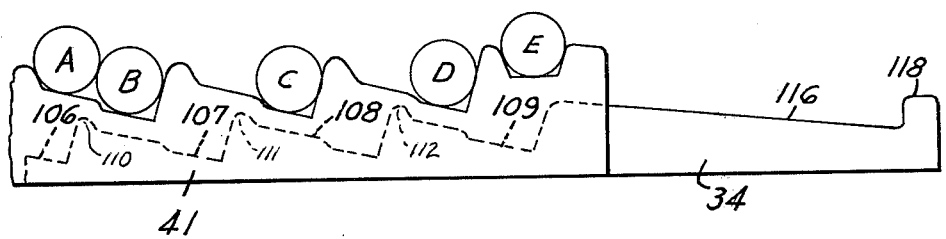

FIG. 7 shows the movable rail 41 having been raised sufficiently to allow the articles C, D to roll over the projections 111 and 112 of the stationary rail and forwardly on the pocket surfaces 121, 122. All the articles have been transferred from the stationary rail 34 to the movable rail 41, but articles A, B and E have not advanced on the conveyor.

Figure 8:
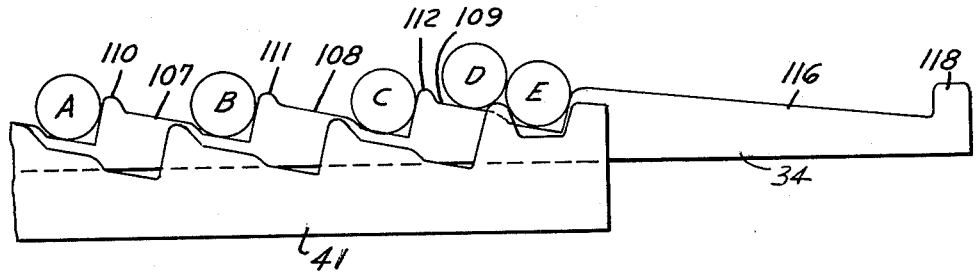

FIG. 8 shows the movable rail 41 having been lowered and retracted somewhat through the operation of the hydraulic cylinder 60 and the lifting mechanism and guide surfaces of the yoke 82 to a point where the articles have been transferred from the movable rail back again to the stationary rail 34. In this instance, articles B, C and D were returned to the stationary rail at a rearward position within the pockets 107, 108 and 109. Subsequently, articles B and C have rolled forward on the surfaces of pockets 107, 108 into abutting engagement with the stops 111 and 112. Article D, however, continues to occupy its rearward position within pocket 109 by reason of its contact with the article E, which has been returned to the forward position in pocket 109. In making the transition between the position of the articles shown in FIGS. 7 and 8, it can be seen that stop 110 has been effective in separating articles A from B and was instrumental in replacing article A on the stationary rail at its former position within pocket 106.

Figure 9:
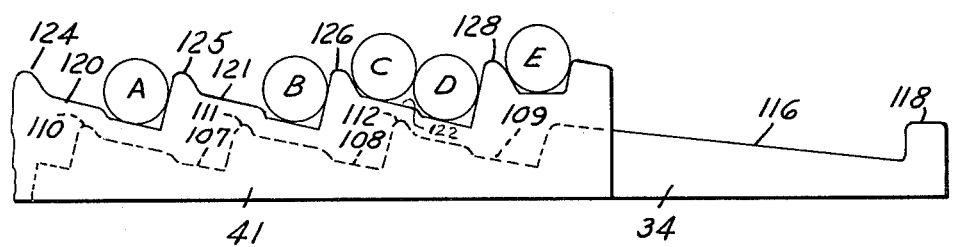
FIGS. 9-12 show the various sequential steps in advancing, accumulating and metering the flow of articles from the conveyor system that result upon raising, advancing, lowering and retracting the movable rail assembly through a second operating cycle.

FIG. 9 shows the movable rail 41 again raised above the upper surface of the stationary rail 34 to a position comparable to that shown in FIG. 7. In this case, articles A and B have been transferred to the movable rail, raised over the crests of projections 110 and 111 and rolled to the forward position of pockets 120, 121 into contact with the stops 125, 126. Similarly, article C was raised from the surface of the stationary rail but did not race past the crest of the stop 112 because article D, occupying the forward position in pocket 122, prevented the forward rolling advance of article C. Therefore, pocket 122 is occupied by articles C and D. Furthermore, article E has been transferred from the forward position of pocket 109 on the stationary rail onto the recess 130 of the movable rail.

Figure 10:
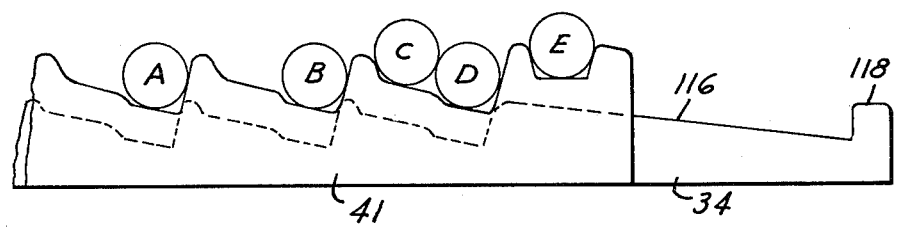

When the hydraulic cylinder 80 is activated with the movable rail 41 in the position of FIG. 9, the relative positions of the movable and stationary rails 41, 34 are as shown in FIG. 10. Longitudinal forward motion of the rail 41 is a direct result of the rolling motion of the dolly acting in response to the force of the hydraulic piston located within the hydraulic cylinder 80. The roller 86 imparts the advancing force to the guide surfaces 84 of the yoke 82 which, being fixedly secured to the movable rail, causes it to advance.

Figure 11:
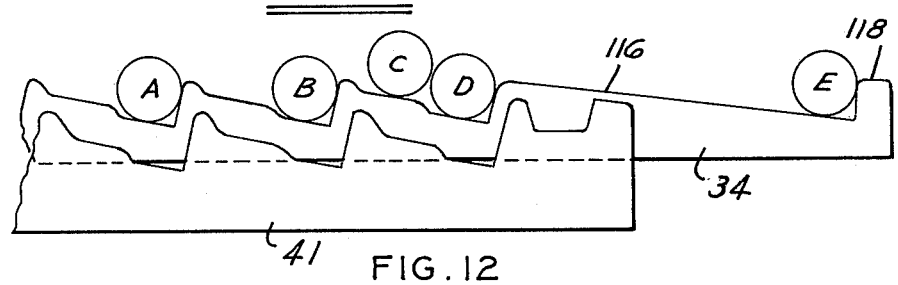
Figure 12:
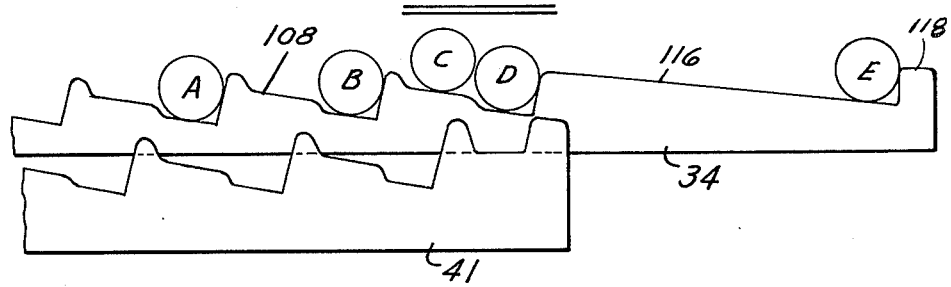

The hydraulic cylinder 60 is next de-energized, and the movable rail is caused to lower along the path defined by the guide surfaces 84 of the yoke 82 to the position shown in FIG. 11. Here, the article E, after being transferred to the sloping surface 116, has rolled forward into contact with the stop 118 and in this position is available for further advance onto either another conveyor or, in the case of a manufacturing operation, into the next machine. The articles A–D are transferred back onto the stationary rail 34 when the movable rail 41 is lowered. Finally, as seen in FIG. 12, the double acting piston of the hydraulic cylinder 80 is pressurized to retract the movable rail.

The articles A–D are seen to have advanced during the raising, advancing, lowering and retracting steps indicated in FIGS. 9–12 with respect to their positions as they appeared in FIG. 8.

A subsequent raising and lowering of the movable rail would advance article A to the rear position within pocket 108 and will advance other articles carried behind A on the conveyor. However, until article E is removed from its position on the surface 116 and the movable rail is advanced as shown in FIG. 10 and lowered as in FIG. 11 thereby depositing article D on the incline surface 116, there can be no further advance for any of the articles. This, of course, is the accumulating aspect of the invention whereby the conveyor may be progressively filled in each pocket location with conveyed articles. Articles having open pocket spaces ahead are advanced forward to an accumulating or abutting position with other articles until all the pocket spaces of the conveyor are filled.

Changes and modifications in the specifically described embodiments can be carried out without departing from the scope of the invention which is intended to be limited only by the scope of the appended claims. For example, although the conveyor system has been described with regard to having a movable rail assembly 38 positioned intermediate the stationary rails, the conveyor system according to this invention could realize a similar result if the movable rail assembly were located on the outer lateral sides of the stationary rails.

Having thus described preferred embodiments of our invention, what we claim and desire to secure by U.S. Letters Patent is:

1. A conveyor for transporting and accumulating articles along its length comprising:
    first rails for supporting articles having a plurality of pockets disposed along the length of said rails, each pocket sloping downwardly and toward the forward direction of transport, adapted to support at least two articles therein and having at its rear extremity a projection extending above the forward end of the succeeding pocket to provide a stop for articles;
    second rails for supporting articles having a plurality of pockets disposed along the length of said rails, each pocket sloping downwardly and toward the forward direction of transport, adapted to support at least two articles therein, and having at its rear extremity a projection extending above the forward end of the succeeding pocket to provide a stop for transported articles, the stops of said second rails being longitudinally disposed intermediate the stops of said first rails;
    recesses located forward of the plurality of pockets of said second rails, each recess having a rear projection that extends above the forward end of the forwardmost pockets of said second rails and a front projection, adapted to support one article therebetween;
    means for moving said second rails for cyclically raising articles from the pockets of said first rails over the rear projections thereof and onto the pockets and recesses of said second rails whereby articles may move forward after being transferred to said second rails and for raising articles from the pockets of said second rails over the rear projections thereof whereby articles may move forward after being transferred onto the pockets of said first rails, and whereby the forwardmost article in the forwardmost pocket of said first rails is transferred to the recesses of said second rails and is transferred back to its former forwardmost position on said first rails thereby preventing other transported articles succeeding the forwardmost article without vacant article support spaces therebetween from advancing along the conveyor.

2. A conveyor for transporting and accumulating articles along its length and for regulating the flow of articles exiting the conveyor comprising:
    first rails for supporting articles having a plurality of pockets disposed along the length of said rails, each pocket sloping downwardly and toward and forward direction of transport, adapted to support at least two articles therein, and having at the rear extremity a projection extending above the forward end of the succeeding pocket to provide a stop for articles;

first projections extending above the forward ends of the forwardmost pockets of said first rails;

second rails for supporting articles having a plurality of pockets disposed along the length of said rails, each pocket sloping downwardly and toward the forward direction of transport, adapted to support at least two articles therein and having at its rear extremity a projection extending above the forward end of the succeeding pocket;

recesses located forward of the plurality of pockets of said second rails, each recess having a rear projection that extends above the forward end of the forward most pocket of said second rails and a front projection, adapted to support one article therebetween;

means for moving said second rails for cyclically raising articles from the pockets of said first rails over the rear projections thereof and onto the pockets and recesses of said second rails whereby articles may move forward after being transferred to said second rails and for raising articles from the pockets of said second rails over the rear projections thereof and onto the pockets of said first rails whereby articles may move forward after being transferred back to said first rails;

means for advancing said second rails while the articles are being supported on the pockets and recesses of said second rails whereby the article located in the recesses of said second rails is moved beyond said first projections and whereby the articles are removed from the pockets and recesses of said first and second rails upon transfer of the articles onto said first rails; and means for retracting said second rails after the articles have been transferred onto said first rails.

* * * * *